United States Patent [19]

Wiley

[11] Patent Number: 4,787,147
[45] Date of Patent: Nov. 29, 1988

[54] QUICK CHANGE MECHANISM FOR DIAMOND ARBOR CIRCULAR SAW BLADES AND OTHER SPINNING DISC DEVICES USING RADIALLY SLIDING LOCKS

[76] Inventor: Edward R. Wiley, 9020 SE. 51st Pl., Mercer Island, Wash. 98040

[21] Appl. No.: 901,887

[22] Filed: Aug. 28, 1986

[51] Int. Cl.⁴ .............................................. F16B 7/00
[52] U.S. Cl. ..................................... 30/388; 403/247; 83/666
[58] Field of Search .......................... 30/388, 390, 391; 83/665, 666; 403/325, 328, 247, 256; 51/372, 374, 376; 408/239 R

[56] References Cited

U.S. PATENT DOCUMENTS

| | | | |
|---|---|---|---|
| 3,869,795 | 3/1975 | Treace | 30/388 |
| 4,205,572 | 6/1980 | Weiner | 30/388 X |
| 4,508,468 | 4/1985 | Irwin | 403/328 |
| 4,657,428 | 4/1987 | Wiley | 30/388 X |

Primary Examiner—Paul A. Bell
Assistant Examiner—Michael D. Folkerts
Attorney, Agent, or Firm—Roy E. Mattern, Jr.

[57] ABSTRACT

This quick change mechanism is a single bolt-on attachment for standard hand held power driven circular saws, to thereafter quickly install and remove diamond arbor saw blades without using any tool. A disc with a raised protruding center body is shaped to fit a standard diamond center blade, which when pressed down over this center body, is centered flat against the upper surface of the disc. The blade is then locked in place by expanding opposite undercut sections, which include the two closest points of the diamond. These expanding sections have undercut slots just above the upper disc surface and serve to wedge the blade down when moved radially outward. These resulting two wedging and sliding locks of the undercut sections are integral with radially sliding members, which move in and out in complementary "V" slots cut into the blade holding disc. Two coil springs inset in cavities drilled into the inside edges of the wedging and sliding locks exert constant outward pressure on these wedging and sliding locks. When the drive shaft is rotating, this locking outward pressure is significantly increased by centrifugal force. A spiral lock ring is inset on the outer diameter surface of the blade holder disc, to limit outward travel of these wedging and sliding locks and to provide circumferential support of the whole assembly. Blade removing is started by pinching the two slide locks, moving them inward.

7 Claims, 3 Drawing Sheets

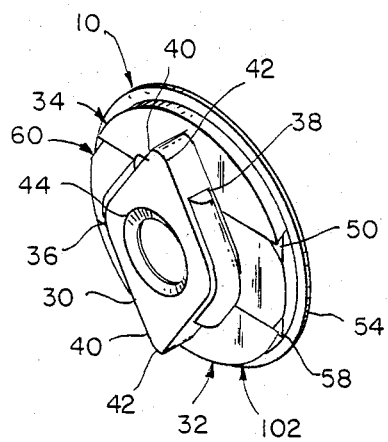
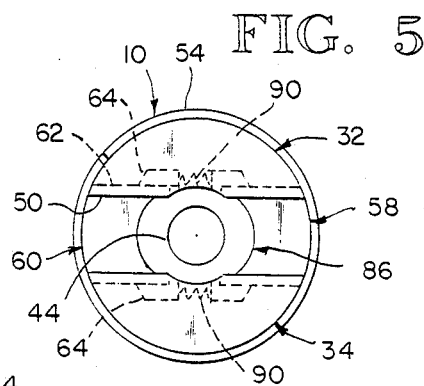
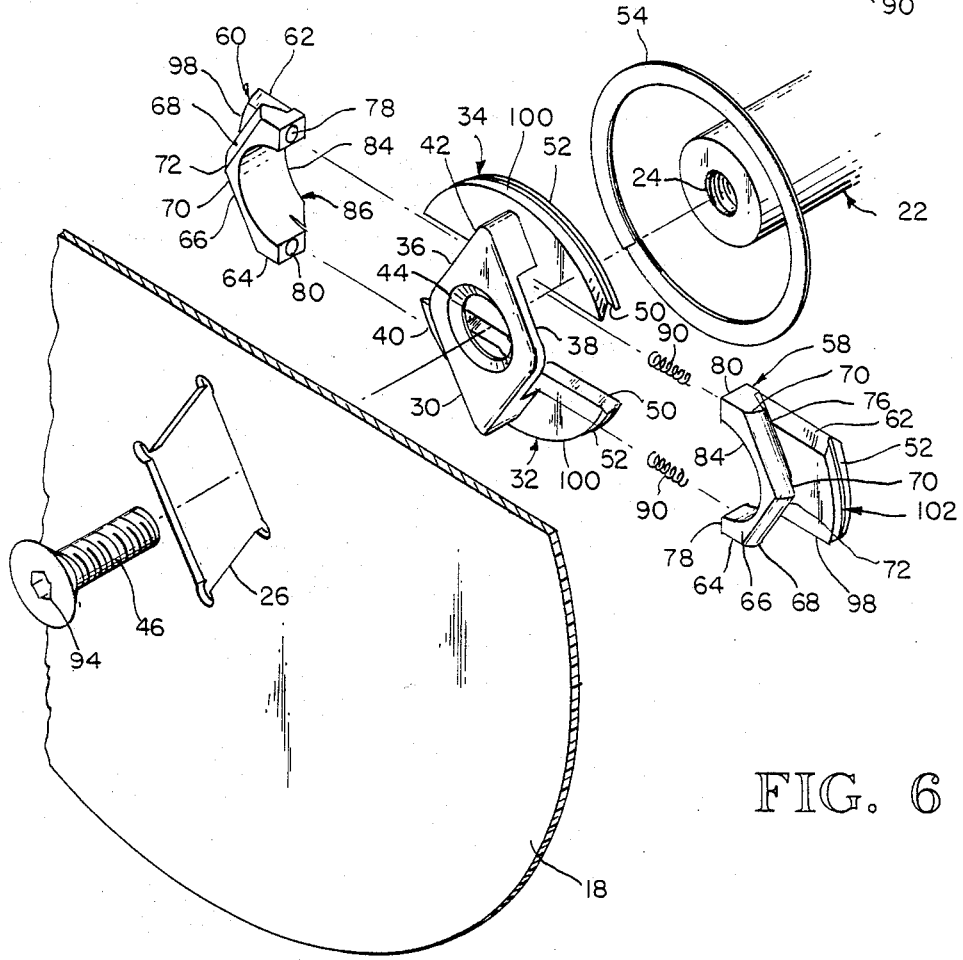

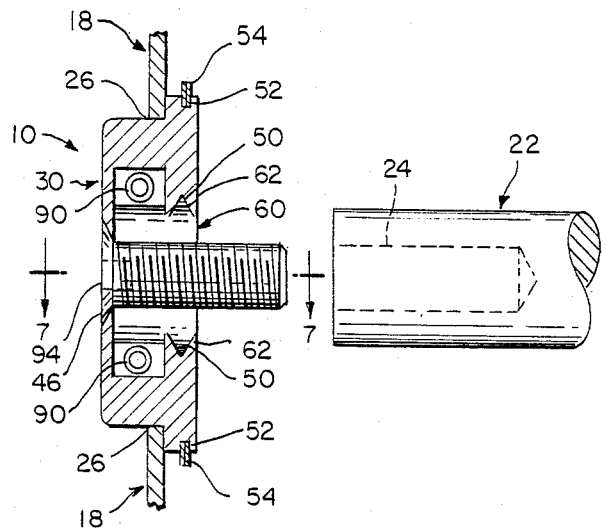
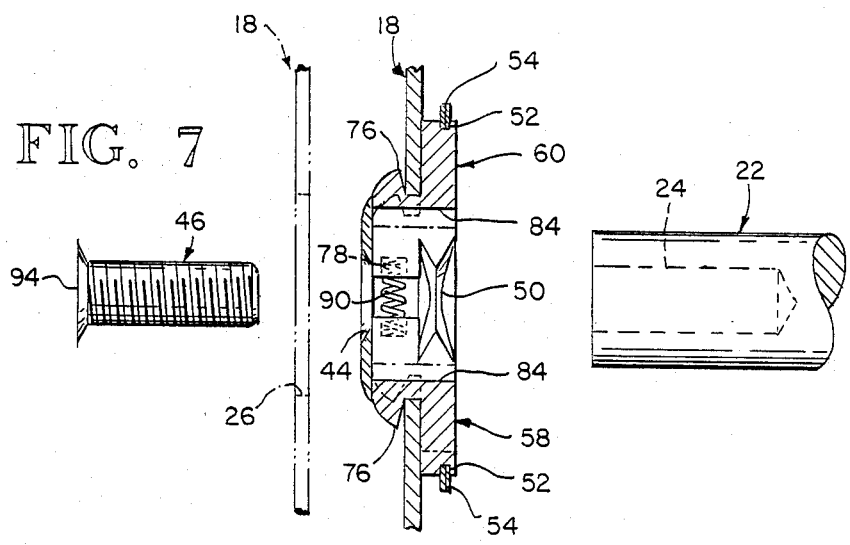

QUICK CHANGE MECHANISM FOR DIAMOND ARBOR CIRCULAR SAW BLADES AND OTHER SPINNING DISC DEVICES USING RADIALLY SLIDING LOCKS

CROSS REFERENCES

The information presented in copending applications Ser. No. 06/774,331 now U.S. Pat. No. 4,657,428 and Ser. No. 06/893,230 now U.S. Pat. No. 4,703,952 is hereby incorporated by reference, as necessary in respect to this Quick Change Mechanism for Installing and Removing Circular Saw Blades as set forth by Edward R. Wiley.

BACKGROUND OF THE INVENTION

This invention relates to mechanism for attachment and removal of circular saw blades on both motor driven hand held saws and stationary table saws. Also such mechanism handles other disc tool heads such as grinder wheels, sander discs and buffers.

Blade changes on power circular saws now on the market generally require the use of two tools, one tool to hold the blade, the other tool to unscrew the nut or bolt which holds the blade on the shaft of the saw. One brand of hand saw has a mechanism for locking the drive gears which eliminates the tool for holding the blade. However, they all have at least two or three nuts, bolts and washers which are removed from the shaft in a blade change operation. This is particularly inconvenient in a cluttered workplace, where special tools provided by the saw manufacturer and/or removable parts are often lost. Today, at least ten special purpose saw blades are sold for use in cutting different materials and for different cutting results in the same material. To obtain best results the appropriate cutting blade should be used. When blade changes are difficult, time consuming, or when special tools are misplaced, blade changes are postponed or not done at all. Therefore there is a need for having a mechanism which is used to more quickly attach and remove circular saw blades, etc. and which is retrofitted to existing hand held power saws and table saws.

SUMMARY OF THE INVENTION

This quick change mechanism enables a user of a power saw to perform circular saw blade installations and removals in a few seconds of time, without using any tools. This mechanism is provided initially when a power saw is manufactured, or the mechanism is provided with instructions and its own installation bolt. The circular saw blades will have the standard diamond arbor central hole. The installation bolt will be furnished to complementary fit the arbor or drive shaft end of a respective power saw.

After this quick change mechanism is quickly and conveniently installed with the complementary fitted installation bolt, a circular saw blade having a diamond shaped arbor central hole is axially depressed over this quick change mechanism and it becomes quickly secured. It remains safely installed, until intentionally released, as a person using his or her fingers radially moves together two alike opposite radially sliding locks, against spring forces, to clear them from holding the circular saw blade in place.

The preferred embodiment of this quick change mechanism, which permits these very conveniently and quickly undertaken steps of both installations and removal of circular saw blades, without using hand tools, is formed, arranged, and fitted together as follows:

A main body is formed by having: two oppositely spaced equal sized arcuate segments which are partial cylindrical portions of limited depth; a central transverse bridge like arch spanning the distance between the spaced arcuate segments and securing them together, and presenting an upstanding diamond projection with surrounding camming top side edges to guide a circular saw blade being axially installed, and with a countersunk central hole to receive the installation bolt. Vee grooves are formed extending across each of the arcuate segments, parallel one to the other, and facing the space between these segments, which is located below the central transverse bridge like arch. Also partial circumferential rectangular outwardly opening grooves are respectively formed in the arcuate segments to receive portions of a surrounding spiral ring.

Two alike radially sliding locks are formed to be moved transversely together and apart, between the arcuate segments and below the bridge like arch. Each one of these sliding locks has parallel vee projection sides to be slidably received in the parallel vee grooves of the arcuate segments of the main body. Each sliding lock has a raised abutment, having in turn an outwardly sloping pointed cam surface, vertical tapered surfaces, joining at a point, which is also the point of the cam surface, and a partial circular saw blade receiving notch positioned below the sloping pointed cam surface to slidably and movably contact a circular saw blade about its diamond arbor hole. Also inwardly in each raised abutment of these sliding locks are two coil spring receiving holes transversely positioned and spaced apart at the same level. Between these spaced coil spring receiving holes, each raised abutment is formed as one half of a central hole, to receive its respective share of a drive shaft of a power saw, which is also referred to as the arbor shaft. Moreover, each sliding lock has a partial circumferential rectangular outwardly opening groove to receive portions of a surrounding spiral ring. The assembly of this quick change mechanism is commenced by inserting transversely two coil springs with their respective ends inserted into the spaced receiving holes of one of the radially sliding locks. Then this subassembly is radially moved between the arcuate segments. Subsequently, the other radially sliding lock is radially moved between the arcuate segments to receive the other ends of the coil springs into its spaced transversely arranged receiving holes. This subassembly is kept together by installing a surrounding spiral ring. When so assembled, these transversely arranged coil springs are constantly trying to move the radially sliding locks away from one another, until they are limited in their outwardly radial movement by contacting the surrounding spiral ring.

This preassembly of these components of the quick change mechanism is then secured to the arbor shaft or drive shaft of the power saw, via its threaded hole, by using the installation bolt, which is finally tightened by utilizing an allen wrench. After such installation, this quick change mechanism is ready to receive the axially directed circular saw blade, as its diamond shaped arbor central hole is fitted over the major diameter upstanding diamond projection of the central transverse bridge like arch of the main body.

As the circular saw blade is continued in its axial movement, it contacts the outwardly sloping pointed cam surfaces of the minor diameter raised abutments of the respective radially sliding locks, causing these sliding locks to move inwardly, against the forces of the two transverse coil springs. The respective portions of the circular saw blade surrounding the diamond arbor central hole, soon clear the outwardly sloping pointed cam surfaces, and then continue their axial movement, until reaching the level of the circular saw blade receiving notches of the radially sliding locks. These respective portions of the circular saw blade, are then also bearing against the planar partial circular saw blade receiving surface, which extends radially outwardly from these respective saw blade receiving notches.

At this time of the axial movement of the circular saw blade, the forces of the two transverse coil springs become quickly effective to outwardly radially move the radially sliding locks, whereby their partial circular saw blade receiving notches fully receive the respective portions of the circular saw blade surrounding the diamond arbor central hole. The circular saw blade then is firmly held in its ready to cut axial position. It so remains in its safe and secure running position, until it is to be intentionally removed. During operations the centrifugal forces insure that the radially sliding locks will remain in their respective locking positions firmly holding the circular saw blade in position, without any needed reliance on the coil springs.

If by chance, someone would start up a power saw without having a circular saw blade in place, then the surrounding spiral ring is relied upon to keep the quick change mechanism well assembled and fully in place on the drive shaft.

If by inadvertence, during the operation of a power saw a board is moved to unwantedly strike the circular saw blade near this quick change mechanism, the major diameter portions of the diamond projections of the main body will be the portions being struck by the board. They will not deflect, and they thereby protect the minor diameter portions of the diamond projections on the radially sliding locks, insuring that the quick change mechanism will not be unlocked or released in any way.

The removal is undertaken quickly by a person, using his or her fingers, to radially move inwardly the radially sliding locks, against the forces of the transverse coil springs, to clear their partial circular saw blade receiving notches from their circular saw blade confining positions. When so cleared, the opposite axial movement of the circular saw blade, clears it off the quick change mechanism and consequently clear of the arbor shaft or drive shaft of the power saw.

The replacement blade is quickly installed by its direct axial movement, which ends as the radially sliding locks move back outwardly again, via the forces of the two transverse coil springs. Thereafter, the partial circular saw blade receiving notches of the respective radially sliding locks are holding the circular saw blade in place, via the assembled quick change mechanism, which is secured to the arbor shaft or drive shaft of the power saw.

DRAWINGS

This quick change mechanism for quickly installing and removing circular saw blades, and other spinning discs, having diamond arbor central holes, with respect to power saws, is illustrated in the drawings, wherein:

FIGS. 1 and 2 illustrate how circular saw blades are and have been installed and removed from a hand held power saw, i.e. the prior art, by using hand tools each time, with respect to the utilization of washers and an installation bolt;

FIG. 3 illustrates how this quick change mechanism will be initially installed with an installation bolt, which is tightened by using an allen wrench, and then thereafter, the circular saw blade, by itself, without using hand tools, will be manipulated by a person using his or her hands and fingers thereof, to both secure it and thereafter to remove it from the arbor shaft or drive shaft of a power saw.

FIG. 4 is a perspective view of the quick change mechanism, when assembled and before its securement to an arbor shaft or drive shaft of a power saw;

FIG. 5 is a bottom view of the quick change mechanism, indicating how the sliding locks are held apart by the coil springs, and moved into contact with the surrounding spiral ring, and in this position, the circular saw blade is being held in place;

FIG. 6 is an exploded partial perspective view to illustrate the relative positioning of all related components, before their sub assemblies and assembly, indicating the diamond shaped arbor hole of a circular saw blade, the installation bolt, and then the main body, the coil springs, the radially sliding locks, the arbor shaft or drive shaft and its threaded hole and the surrounding spiral ring of the quick change mechanism;

FIG. 7 is an exploded partial top view to illustrate further the relative positioning of the installation bolt, the circular saw blade, the quick change mechanism, indicating the transversely arranged coil springs thereof, which keep the radially sliding locks apart in their transverse movement locking positions, and the arbor shaft or drive shaft of the power saw having the threaded hole to receive the installation bolt, which holds the quick change mechanism in place; and FIG. 8 is a partial side view, with some portions broken away, to show the almost ready to go position of the circular saw blade, as its portions surrounding its arbor central diamond hole are securely held in place axially by the quick change mechanism, and thereby will soon be firmly held in place relative to the arbor shaft or the drive shaft of a power saw when the installation bolt is installed.

DESCRIPTION OF THE PREFERRED EMBODIMENT

Figure 1:
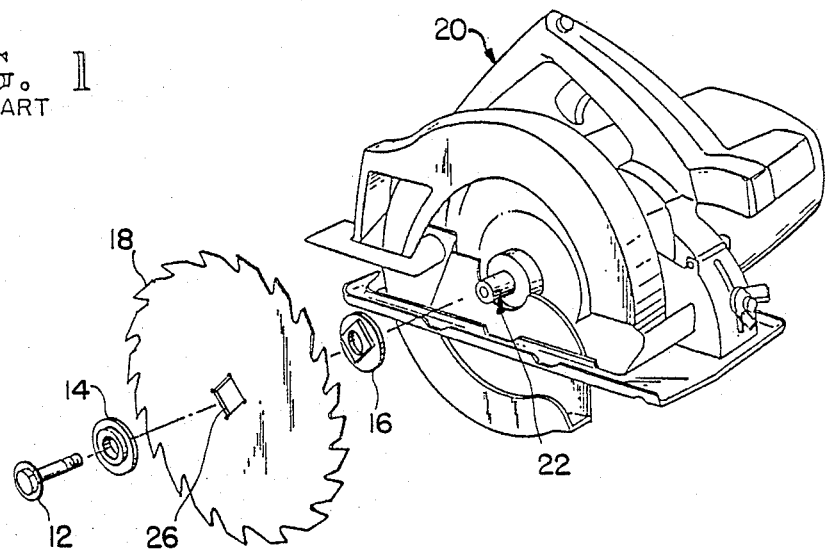
Figure 2:
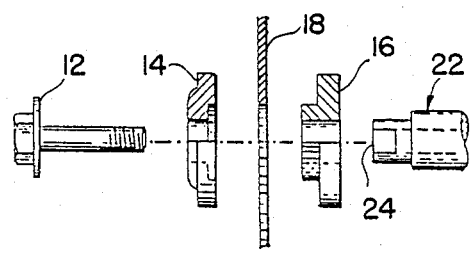

The preferred embodiment of the quick change mechanism 10, is illustrated in FIGS. 3 through 8. It is used instead of the installation bolt 12 and respective washers 14 and 16, which are and have been used during each on and off installation of a circular saw blade 18 of a hand held power saw 20, or other power saws, not shown, on an arbor shaft 22, or drive shaft 22, of such a power saw 20, as shown in FIGS. 1 and 2, wherein this drive shaft 22 has an internally threaded hole 24, to receive the installation bolt 12.

Considerable time is required to take off a circular saw blade 18 and then to install a replacement blade 18, using hand tools, not shown, to rotate the installation bolt 12, and, when necessary, to keep the drive or arbor shaft 22 from rotating. As an operational consequence, a user of a power saw 20 tends to leave a circular saw blade 18, or other spinning disc, not shown, on the arbor shaft 22, when it has already become dull and yet should be replaced with a sharpened circular saw blade 18. Or the user will keep one type of a circular saw blade 18 on the arbor shaft 22, when he or she should be using another circular saw blade 18 of a different type to cut more efficiently a different material.

In direct contrast, once this quick change mechanism 10 is installed, using initially only an allen wrench, not shown, then thereafter, no hand tools are needed, either to install or to remove a circular saw blade 18 with respect to the arbor shaft 22 or drive shaft 22 of a power saw 20. Moreover, as assembled and installed, this quick change mechanism 10 requires very little axial space and essentially, after installation, surrounds the drive shaft 22. Therefore, it is readily installed and used with all power saws 20, inclusive of those power saws which provide very limited clearance. During the performance of the on and off steps, undertaken either to install or to remove a circular saw blade 18 with respect to an arbor shaft 22, or a drive shaft 22, the person who will be operating the power saw 20, only uses his or her hands and fingers, either to install or to remove the circular saw blade 18, having the diamond arbor central hole 26.

Figure 3:
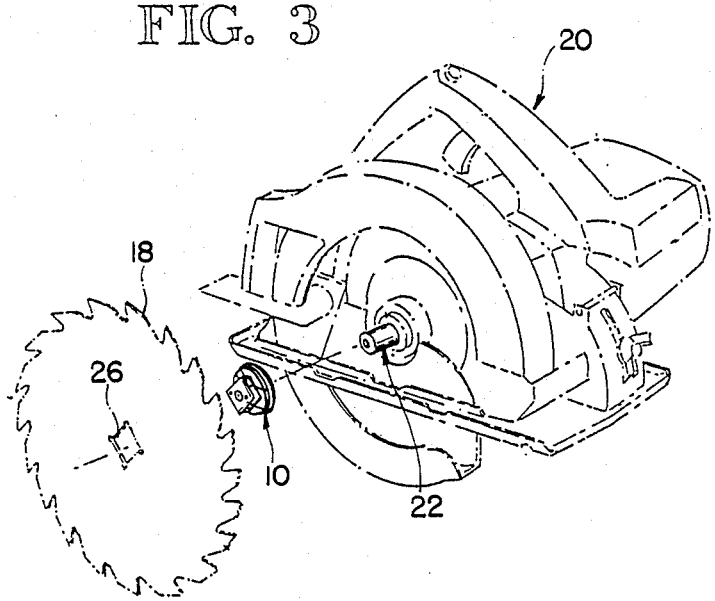

FIG. 3 shows the preassembly relative positions of a circular saw blade 18, this quick change mechanism 10, and a hand held power saw 20. These relative positions are illustrated also in FIG. 7, just before a circular saw blade 18 is to be axially pushed toward the quick change mechanism 10, which is to be secured to the arbor shaft 22, or drive shaft 22, of the power saw 20. Then as the circular saw blade 18 completes its axial movement, as also shown in FIG. 7, when pushed by the fingers of one's hands, it is held captive axially in its cutting position, by the quick change mechanism 10, which is essentially permanently mounted on the arbor shaft 22, or the drive shaft 22 of the power saw 20, or other type of power saw, not shown.

The assembled quick change mechanism 10, before its installation, appears, as shown in FIG. 4, indicating its compact axial arrangement. How the quick change mechanism 10 is itself made and then assembled is illustrated in FIG. 6.

MAIN BODY OF THE QUICK CHANGE MECHANISM

This quick change mechanism 10, as especially illustrated in FIGS. 4 through 8, and as particularly shown in FIG. 6, has a main body 30, which is formed by having two oppositely spaced equal sized arcuate segments 32, 34, which are partial cylindrical portions of limited depth. Then these segments 32, 34, are securely positioned by a central transverse bridge like arch 36, spanning the distance between the spaced arcuate segments 32, 34, and securing them together. The resulting space 38 between the arcuate segments 32 and 34 and below the transverse arch 36 provides a central transverse continuous opening 38.

At the top of the bridge arch 36 is an integral upstanding diamond projection 40, of a major diameter, with surrounding camming top side edges 42, which are used in guiding a circular saw blade 18, having a diamond arbor central hole 26, during its axial installation. Through the central portion of this diamond projection 40 and the bridge arch 36, a countersunk central hole 44 is formed to receive a specially made installation bolt 46 of a proper length and thread size to hold this quick change mechanism 10 firmly in place, with respect to a designated internally threaded hole 24 in the end of an arbor shaft or drive shaft 22 of a particular manufacturer's power saw 20.

Vee grooves 50 are formed extending across each of the arcuate segments 32, 34, parallel one to the other, and facing the central transverse continuous opening 38, which is located between them and below the bridge like arch 36. Also partial circumferential rectangular outwardly opening grooves 52 are respectively formed in the arcuate segments 32, 34, to receive portions of a surrounding spiral ring 54.

TWO RADIALLY SLIDING LOCKS OF THE QUICK CHANGE MECHANISM

Two alike radially sliding locks 58, 60, are formed to be moved transversely together and apart, between the arcuate segments 32, 34 and below the bridge arch 36. Each one of these sliding locks 58, 60, has parallel vee projection sides 62, to be slidably received in the parallel vee grooves 50 of the arcuate segments 32, 34 of the main body 30.

Each sliding lock 58, 60, has a raised abutment or projection 64, nearer the center of this quick change mechanism 20. Each abutment 64 in turn has an outwardly sloping pointed cam surface 66 and also vertical tapered surfaces 68, 70, joining at a common point 72, which is also the point 72 of the cam surface 66. In addition, each sliding lock 58, 60 has a partial circular saw blade receiving notch 76, which is positioned below the sloping pointed cam surface 66, to slidably and movably contact a circular saw blade 18 about its diamond arbor central hole 26. The distance from each raised projection 64 to the other one remains as a minor diameter.

Also inwardly, in each raised abutment 64 of these sliding locks 58, 60, there are two coil spring receiving holes 78, 80 transversely positioned and spaced apart at the same level. Between these spaced coil spring receiving holes 78, 80, each raised abutment 64 is formed as one half 84 of a central hole 86, to receive its respective share of an arbor shaft 22 or drive shaft 22 of a power saw 20. Moreover, each radial sliding lock 58, 60, has a partial circumferential rectangular outwardly opening groove 52, like grooves 52 of the main body 10, to receive portions of the surrounding spiral ring 54.

THE PREASSEMBLY, ASSEMBLY, AND INSTALLATION OF THE QUICK CHANGE MECHANISM, USING COIL SPRINGS, SURROUNDING SPIRAL RING, AND INSTALLATION BOLT

The preassembly, assembly, and installation of this quick change mechanism 10, is commenced by inserting transversely two alike coil springs 90 with their respective ends inserted into the spaced coil spring receiving holes 78, 80, of one 58 of the radially sliding locks 58, 60. Then this subassembly is radially moved between the arcuate segments 32, 34 of the main body 30.

Subsequently, the other radially sliding lock 60 is radially moved between the arcuate segments 32, 34, to receive the other ends of the coil springs 90 into its spaced transversely arranged coil spring receiving holes 78, 80. Then this subassembly is kept together, as a preassembly, by installing a surrounding spiral ring 54 fitting the overall circumferential groove 52.

When so assembled, these transversely arranged coil springs 90 are constantly trying to move the radially sliding locks 58, 60 away from one another, until they are limited in their outwardly radial movement by contacting the surrounding spiral ring 54.

This preassembly of these components of this quick change mechanism 20, is then secured to the arbor shaft 22, also called the drive shaft 22, of the power saw 20, via its internally threaded hole 24, by using the installation bolt 46. It has a countersunk head, inclusive of a receiving hole 94, to receive an allen wrench, not shown, used only during this installation of the quick change mechanism 20, to finally tighten this installation bolt 46. After its tightening, the quick change mechanism 10 is ready to receive and to hold a circular saw blade 18.

THE VERY QUICK INSTALLING AND/OR REMOVING STEPS OF A CIRCULAR SAW BLADE, WITH RESPECT TO A POWER SAW USING THE QUICK CHANGE MECHANISM

After the convenient installation of this quick change mechanism 10, on arbor shaft 22, or drive shaft 22 of a power saw, as indicated in FIGS. 3, 6, 7 and 8, this quick change mechanism 10, is ready to receive the axially directed circular saw blade 28, as its diamond shaped arbor central hole 26 is fitted over the camming edges 42 and the upstanding diamond projection 40 of the major diameter of the central transverse bridge like arch 36 of the main body 30, as shown in FIGS. 7 and 8.

As the circular saw blade 18 is continued in its axial movement, it contacts the outwardly sloping pointed cam surfaces 66 of the raised abutments 64 or projections of the minor diameter of the respective radially sliding locks 58, 60, causing these sliding locks 58, 60 to move inwardly, against the forces of the two transverse coil springs 90. The respective portions of the circular saw blade 18, surrounding the diamond arbor central hole, soon clear the outwardly sloping pointed cam surfaces 66, beyond the common point 72, and then continue their axial movement, until reaching the level of the circular saw blade receiving notches 76 of the radially sliding locks 58, 60. These respective portions of the circular saw blade 18, are then also bearing against the planar partial circular saw blade receiving surfaces 98, which respectively extend radially outwardly from these respective saw blade receiving notches 76 on the respective radial sliding locks 58, 60. These receiving surfaces 98, combine with the top circular saw blade partial receiving surfaces 100 of the arcuate segments 32, 34, to complete an overall circular saw blade receiving surface 102.

At this time of the axial movement of the circular saw blade 18, the forces of the two transverse coil springs 90 become quickly effective to outwardly radially move the radially sliding locks 58, 60, whereby their partial circular saw blade receiving notches 76 fully receive the respective portions of the circular saw blade 18 surrounding the diamond arbor central hole 26.

The circular saw blade 18 is then firmly held in its ready to cut, and cutting axial position. It so remains in its safe and secure running position, until the respective circular saw blade 18 is to be intentionally removed. During the cutting operations at the higher speeds such as 5000 or more revolutions per minute, the centrifugal forces insure the continuing locking of the circular saw blade by the radially sliding locks. They, themselves are being forced to maintain their locking positions. There is no reliance on the coil springs to keep the spinning circular saw blade in place via their action on the radially sliding locks.

If during the high speed spinning of a circular saw blade, a user of a power saw unwantedly moves a board so it strikes the quick change mechanism, the spinning major diameter diamond projections on the main body are the first and only portions of the quick change mechanism to make contact with the board. They protect the minor diameter diamond projections or abutments of the radially sliding locks, thereby preventing any unlocking of this quick change mechanism, by any misdirected board.

Moreover if anyone would unwantedly start and run a power saw without installing a circular saw blade, this quick change mechanism stays together, as the spiral ring keeps the assembled components together.

The removal of the circular saw blade 18 is undertaken quickly by a person, using his or her fingers, to radially move inwardly the radially sliding locks 58, 60, against the forces of the transverse coil springs 90, to clear their partial circular saw blade receiving notches 76 from their circular saw blade confining positions. When so cleared, the opposite axial movement of the circular saw blade, clears it off the quick change mechanism 10, and consequently the circular saw blade 18 is moved axially clear of the arbor shaft 22, or drive shaft 22, of the power saw 20.

Then a replacement circular saw blade 18, or another spinning disc, not shown, is quickly installed by its direct axial movement, which ends, as the radially sliding locks 58, 60 move back outwardly again, via the forces of the two transverse coil springs 90. Thereafter, the partial circular saw blade receiving notches 76, of the respective radially sliding locks 58, 60, are securely and safely holding the circular saw blade 18, or spinning disc, in place, via the assembled quick change mechanism 10, which is secured to the arbor shaft 22, or drive shaft 22 of the power saw 20.

The time which elapses either during the installation or the removal of the circular saw blade from the stopped, and preferably electrically disconnected, or shut off power saw 20, or other type of saw, not illustrated, is referred to in seconds of a minute. So when a power saw 20 has this quick change mechanism 10, installed on its arbor shaft 22, or drive shaft 22, the user tends to quickly remove circular saw blades 18, when he or she first realizes they are cutting poorly, having become too dull for efficiently cutting material. Then he or she quickly installs a sharpened circular saw blade 18, or a new circular saw blade 18. Or when a power saw 30 has this quick change mechanism 10 installed on its arbor shaft 22, or drive shaft 22, the user likewise tends to quickly remove a circular saw blade 18 of one type, to install another one 18 of a different type, or a spinning disc, if the cutting and/or forming operational steps and/or procedures, will be more efficiently undertaken to produce a better product. Whatever type of a rotatable work contacting member is selected, having a diamond arbor central hole, it will be quickly installed, and then later, when desired, it will be quickly removed.

I claim:

1. A quick change mechanism, operable in seconds, to change rotatable work contacting members, such as circular saw blades, which have diamond arbor central holes, with respect to drive shafts of power tools, which have internally threaded holes to receive installation bolts, comprising the preassembly of:

(a) a main body for rotating radially about the axis of a drive shaft of a power tool having:

(i) an axially protruding receiving means establishing a major diameter to guide the axial movement of a work contacting member, such as a circular saw blade, which has a diamond arbor central hole;

(ii) a partial radial receiving means formed in the axially protruding receiving means to partially receive a blade locking means; and (iii) a partial surrounding partial blade receiving means, in turn having a partial radial receiving means, radially in line with the partial radial receiving means formed in the axial protruding receiving means, and these two partial radial receiving means form an overall radial receiving means; and (b) a locking means slidably received in the overall radial receiving means having radially slidable locks for radial movement together to clear a circular saw blade, and for radial movement apart to lock a circular saw blade adjacent to the partial surrounding partial blade receiving means, and having a spring means to keep the radially slidable locks apart in their circular saw blade holding and locking positions;

(c) an axially protruding receiving means on each radially slidable lock, establishing a minor diameter, to guide the axial movement of a circular saw blade which has a diamond arbor central hole, when the axially protruding receiving means on the main body is also guiding the circular saw blade, and during such guidance, the radially slidable locks are first moved radially toward one another, when in contact with the circular saw blade, against the force of the spring means, and then, after the axial clearance of the circular saw blade, the radially slidable locks are moved apart by the force of the spring means to hold and to lock the circular saw blade in place;

(d) a surrounding holding means to keep the main body and the radially slidable locks together in a preassembly, while providing clearance for the radial movements of the radially slidable locks of the locking means;

(e) a receiving means in the main body to accommodate an end of a drive shaft of a power saw;

(f) a center receiving means on the main body to accommodate an installation bolt used in securing this quick change mechanism to the end of a drive shaft, which has an internally threaded hole to receive this installation bolt;

(g) receiving means in each radially slidable lock to accommodate one half diameter of an end of a drive shaft of a power saw;

(h) a radial opening of the overall radial receiving means, having parallel vee grooves arranged on each side of this radial opening; and (i) parallel vee projections arranged on each side of each radially slidable lock to slidably fit the parallel vee grooves of the overall radial receiving means.

2. A quick change mechanism, as claimed in claim 1, wherein each radially slidable lock at its outer radial end has a partial circumferential groove to receive portions of the surrounding holding means, and wherein the main body has a partial circumferential groove to receive portions of the surrounding holding means.

3. A quick change mechanism, as claimed in claim 2, wherein the axially protruding receiving means on each slidable lock has a radially pointed sloping surface and two converging side surfaces, depending from the radially pointed sloping surface, all these surfaces ending at a common point, which guide the axial movement of a circular saw blade.

4. A quick change mechanism, as claimed in claim 3, wherein each radially slidable lock of the locking means has a receiving slot in each axially protruding receiving means located at and below the common point, to receive portions of a circular saw blade about the diamond arbor central hole, when the circular saw blade is locked by the radially slidable locks, as the spring means becomes effective, when the circular saw blade has been axially moved over the main body and over the axially protruding receiving means of the radially slidable locks.

5. A quick change mechanism, as claimed in claim 4, wherein each radially slidable lock of the locking means, has a partial blade receiving means extending outwardly from the receiving slot and the common point, to be planar with the surrounding partial blade receiving means of the main body, to complete an overall circular saw blade receiving means.

6. A quick change mechanism, as claimed in claim 5, wherein the axially protruding receiving means of the main body has a pair of radially oppositely located group of surfaces, wherein each group of surfaces, has a radially directed outwardly, sloping pointed surface, and two converging side surfaces, depending from the sloping pointed surface, all three of these surfaces ending at a respective common point, which guide the axial movement of a circular saw blade, until this circular saw blade reaches the surrounding partial blade receiving means of the main body.

7. A quick change mechanism, operable in seconds, to change rotatable work contacting members, such as circular saw blades, which have diamond arbor central holes, with respect to drive shafts of power tools, which have internally threaded holes to receive installation bolts, comprising the preassembly of:

(a) a main body: having two oppositely spaced equal sized arcuate segments defining a cylindrical volume of limited depth; a central transverse continuous opening created by the spaced equal sized arcuate segments; an arch shaped as a diamond upstanding projection of a major diameter in respect to the major diameter of the diamond arbor central hole and spanning across the spaced arcuate segments and over the central transverse continuous opening, having a countersunk central hole to receive an installation bolt; vee grooves extending across each of the arcuate segments and arranged parallel to each other and facing the central transverse continuous opening; and partial circumferential rectangular outwardly opening grooves; and (b) two alike radially sliding locks, each having: parallel vee projection sides, to be slidably received in the vee grooves of the spaced equal sized arcuate segments of the main body; a raised abutment, having in turn a sloping pointed cam surface, a circular saw blade receiving notch cut into the raised abutment clear of the sloping pointed cam surface, tapered surfaces depending from the sloping pointed cam surface, and remaining clear of the circular saw blade receiving notch, joining at a point, which is also common with the point of the sloping pointed cam surface, which slidably and movably contacts a circular saw blade about the diamond arbor hole thereof, two coil spring receiving holes which are spaced apart at the same level, one half of a central hole to receive half the diameter of a drive shaft of a power saw, and a partial circumferential rectangular outwardly opening groove, with the two raised abutments arranged on a minor diameter, in respect to the minor diameter of the diamond arbor central hole;

(c) two coil springs for parallel, spaced, transverse placement using the coil spring receiving holes to receive their respective designated spring end portions; and (d) a surrounding spiral ring placed in the circumferential rectangular outwardly opening grooves of both the main body and the two alike radial sliding locks, to complete the preassembly of this quick change mechanism, which when secured by using an installation bolt to the drive shaft of a power saw, via a central threaded hole of the drive shaft, thereafter receives a rotatable work contacting member, such as a circular saw blade, which has a diamond arbor central hole, as this saw blade is passed over the diamond shaped upstanding arch projection of a major diameter, and over the raised sloping pointed cam surfaces of the radial sliding locks of a minor diameter, and then this saw blade is held in place, via the saw blade receiving notches of these radial sliding locks, which are moved radially outwardly into their radial locking positions, via the spring forces of the coil springs, until reaching the surrounding spiral ring, and then the circular saw blade remains in its cutting secured position, until a person's fingers are used to inwardly and radially move together the two alike radial sliding locks, clearing their saw blade receiving notches from the circular saw blade portions, which surround the diamond arbor hole of the circular saw blade, and at all times during the operation of a power saw, the radial sliding locks, via their centrifugal forces, are being forced to remain in their locking positions, and the major diameter arch projection protects the minor diameter cam surfaces of the radial sliding locks from any dislodgement by being struck by a misdirected board.

* * * * *